Sept. 14, 1965     W. S. PEPPLER     3,206,588
THERMAL IMPULSE SEALING BAR CONSTRUCTION
Filed Aug. 20, 1963
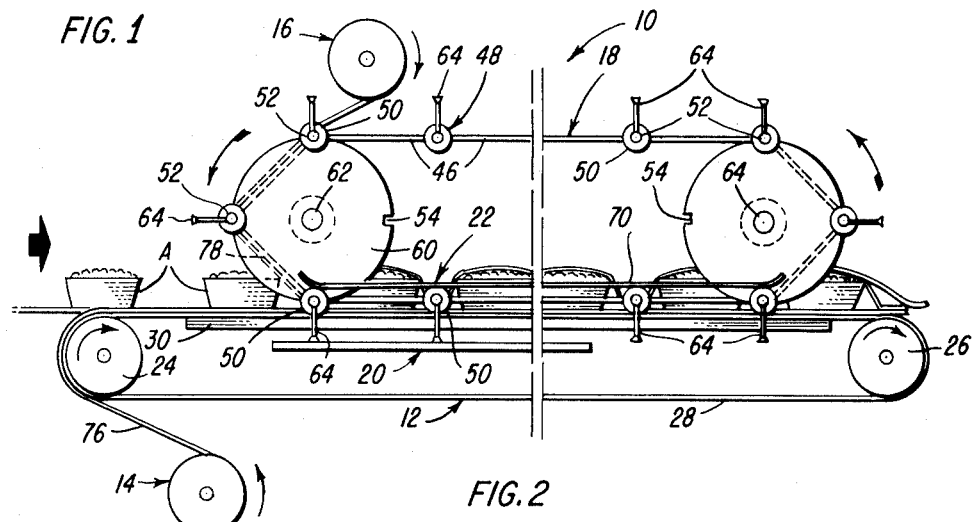
FIG. 1
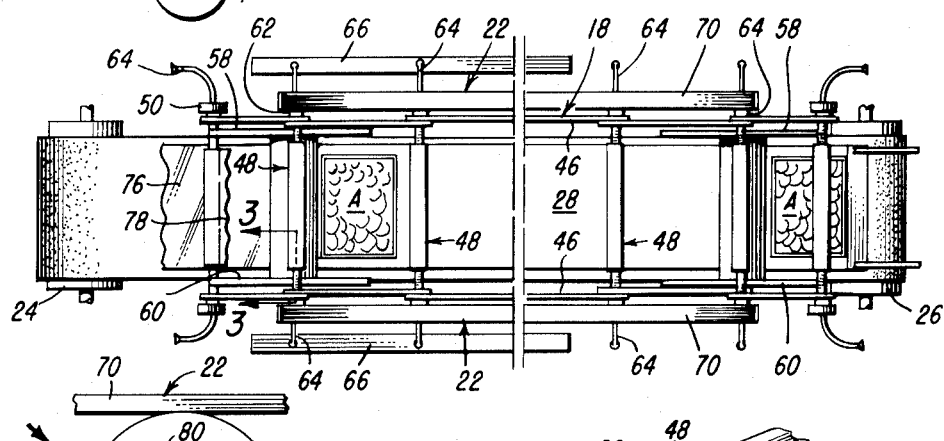
FIG. 2
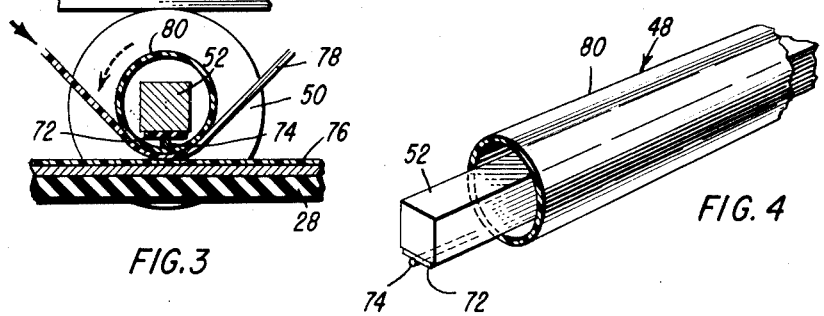
FIG. 3
FIG. 4
INVENTOR
*William S. Peppler*
BY  Karl W. Flocks
ATTORNEY

United States Patent Office 3,206,588
Patented Sept. 14, 1965

3,206,588
THERMAL IMPULSE SEALING BAR CONSTRUCTION
William S. Peppler, Chappaqua, N.Y., assignor to Diamond International Corporation, a corporation of Delaware
Filed Aug. 20, 1963, Ser. No. 303,258
3 Claims. (Cl. 219—244)

This invention relates generally to resistance-heater type sealing bars and more particularly to an improved resistance type heat sealing bar construction particularly adapted to extend the life of conveyor belts as well as heater bars as well as providing means whereby an effective seal on plastic wrapped packages may be readily and expeditiously produced.

The particular heat sealing bars of the present invention are adapted for use on the apparatus disclosed and described in applicant's co-pending U.S. application Serial No. 215,414, filed August 7, 1962, entitled "Wrapping Apparatus."

In the apparatus of the character disclosed in applicant's co-pending application mentioned above, heat sealing bars are periodically energized for the purpose of producing transverse seals between adjacent articles being wrapped. Certain heat-sealable wrapping materials when engaged by a sealing wire have a tendency to momentarily become sticky and adhere to the sealing wire or adjacent parts of the sealing bar. Further, in wrapping apparatus of the character disclosed, the conveyor of "Teflon," fiberglass etc., is normally subjected to the direct heat of a thermo-impulse heating wire continuously at the same area as previously formed seals. The concentration of heat at exactly the same location of these conveyors time-after-time often results in increased wear of those parts of the conveyor continuously subjected to impulse heat as compared with adjacent portions of such conveyors.

In order to obviate and substantially reduce the sticking of the wrappers and/or excessive wear on conveyor belts, a primary object of the present invention is to provide means on an impulse heat sealing bar which prevents wrapper sticking and excessive conveyor belt wear.

Another object of the present invention is to provide a novel thermo-impulse heat sealing bar construction which includes a heat-conducting shield rotatably mounted thereon whereby different areas of this shield are subjected to impulse heat during each time the sealing bar is energized during the formation of a seal in a package to extend the use-life of the sealing bars.

A more specific object of the present invention is to provide an elongated support bar having mounted thereon a resistance-heating element which is periodically energizable for forming a seal on a package utilizing heat-sealable material, and including a freely journaled tubular shield which is momentarily rotated during each sealing operation to minimize wear thereon.

Other and more specific objects of the present invention become apparent from a consideration of the following description taken in conjunction with the accompanying drawings forming a part thereof, wherein:

FIG. 1 is a diagrammatic elevational view of typical wrapping apparatus in which the novel sealing bar constructions of the invention are used;

FIG. 2 is a top plan view of the apparatus of FIG. 1;

FIG. 3 is an enlarged fragmentary section taken substantially on the plane of line 3—3 of FIG. 2; and FIG. 4 is an enlarged fragmentary perspective view showing details of the thermo-impulse heat sealing bar construction of the invention.

Referring now to the drawing in detail and first considering FIGS. 1 and 2, the apparatus disclosed and described in detail in applicant's co-pending application Serial No. 215,414 is generally indicated at 10 and comprises an endless conveyor indicated generally at 12, a first supply source of heat-sealable wrapping material indicated generally at 14, a second source of heat-sealable wrapping material indicated generally at 16, combined heat-sealing and pressure-applying means indicated generally at 18, energizing means for thermo-impulse heat sealing bars indicated generally at 20 and pressure-applying guide means indicated at 22.

The conveyor 12 includes spaced parallel support drums or rolls 24 and 26 over which is entrained an endless belt 28 comprising a heat-resistance material of laminated silicone rubber or the like with a "Teflon" fiberglass coating, etc., for example. The upper run of the conveyor belt 28 will move over a relatively rigid support plate 30 and the upper conveyor run will move from left to right as seen for example in FIG. 1. A plurality of articles A will be disposed in spaced relation on the upper run of the conveyor belt and disposed on an endless web of heat-sealable material from the source 14. Additionally, the source of heat-sealable wrapping material 16 will be fed on top of the articles A; and the heat-sealable and pressure-applying means 18 will cause this material to be fed on the top of articles A.

The means 18 comprises a plurality of pivotally connected or articulated links 46 suitably connected to transversely spaced thermo-impulse heat sealing bars, constructions indicated generally at 48. The constructions or assemblies 48 include at opposite ends thereof pressure wheels 50 which are journalled at opposite ends of a support bar 52. The bars 52 periodically engage in peripheral notches 54 formed on pairs of spaced disc elements 58 and 60 mounted on suitably rotated spaced support shafts or axles 62 and 64.

Electrically energized bus bars 66 are disposed below and in parallel relation to the upper run of the conveyor 28, and guide tracks or bars 70 comprising the pressure-applying guide means 22 are engaged by the wheels 50 for the purpose of urging the bars 52 into pressure engagement on juxtaposed layers of the heat-sealable wrappers.

The apparatus described and the novel thermo-impulse heat sealing bar constructions thereof may be readily used with single sheets of a heat-sealable wrapping material.

Considering FIGS. 3 and 4, the elongated support bar 52 is disclosed as having a rectangular cross section, however, other cross sections may be utilized in the production thereof. The support bar 52 has secured on one surface thereof and extending the length thereof a sheet of insulating material 72 to which is suitably secured a relatively thin, elongated resistance-type heating element comprising a wire 74. The wire 74 includes on the terminal ends thereof a "trolley-shoe" 64 which engages the bus bars 66 (one at each side edge of the conveyor run and at each end of the wire 74, to cause the wire 74 to be energized and current to flow therethrough). When this occurs, the sheets of heat sealable material 76 and 78, see FIG. 3, will become plastic at the area or point engaged by the heat sealing elements and when they cool will adhere to form a transverse seal on the wrapper being formed about the articles A.

Circumposed about the support bar 52 and resistance heating wire 74 is a tubular shield 80 which extends the length of the bar 52 and which is freely journaled thereon. The tubular shield 80 will rotate when engaged on the wrapping sheets 76 and 78 as indicated by the dotted direction arrow in FIG. 3 and thus a different area of contact will be disposed adjacent the resistance heating wires 74 during successive heat sealing operations. The free rotation of the shield 80 will minimize and obviate the concentration of impulse-heating in any particular point along the shield 80 i.e. random longitudinal areas of the shield 80 will be engaged by the heat sealing wire 74 during energization thereof, and thus the maximum-life wear will be obtained from the shield 80.

The shield 80 will be formed from a suitable material such as fiberglass, "Teflon," "Teflon"-coated fiberglass etc., i.e. any type of material that will not adhere to the conveyor 28 or the wrapping sheets which are periodically made plastic due to the concentrated heat emitted from the thermo-impulse heating element. Further, through the use of "Teflon," and the inherent lubricating properties thereof, the shields 80 will readily rotate with a minimum of resistance with respect to the support bar and impulse-heating element about which it is circumposed.

It will be obvious to those skilled in the art that various changes may be made without departing from the scope of the invention and therefore the invention is not limited to what is shown in the drawings and described in the specification but only as indicated in the appended claims.

What is claimed is:

1. A heat sealing bar construction for use on thermo-impulse heat-sealing machines for heat-sealable sheets or the like comprising an elongated support bar, a current conducting resistance heating element secured on said support bar for fusing heat-sealable sheets, and an elongated heat-conducting tube circumposed about said support bar and resistance-heating element and suspended on said bar, said tube being rotatable about the longitudinal axis of said bar and being freely movable in random radial directions relative to said longitudinal axis for preventing direct contact of said resistance-heating element with the heat-sealable wrapping material, said resistance-heating element comprising a thin elongated wire extending the entire length of said support bar and extending outwardly from the surface thereof and engageable with an inner linear surface of said heat-conducting tube.

2. A heat sealing bar construction as set forth in claim 1 wherein said support bar is electrically conductive, and electrical-insulating means is secured between said bar and said resistance-heating element.

3. The structure of claim 1 in which said heat-conducting tube is circular in cross section and comprises a friction-resistance material which is non-adherent to heat sealable sheet material when thermo-impulse heat is applied through said heat conducting tube.

References Cited by the Examiner

UNITED STATES PATENTS

| | | | |
|---|---|---|---|
| 2,047,372 | 7/36 | Jalens | 219—469 X |
| 2,339,492 | 1/44 | Lewis | 219—244 X |
| 2,401,820 | 6/46 | Fairley | 219—244 X |
| 2,556,008 | 6/51 | Spalding | 156—582 X |
| 3,059,690 | 10/62 | Nyborg | 156—583 X |

RICHARD M. WOOD, *Primary Examiner.*

ANTHONY BARTIS, *Examiner.*